United States Patent
Garg et al.

(10) Patent No.: US 11,064,027 B2
(45) Date of Patent: Jul. 13, 2021

(54) METHOD AND SYSTEM FOR DYNAMIC LICENSE PLATE NUMBERS

(71) Applicant: MASTERCARD INTERNATIONAL INCORPORATED, Purchase, NY (US)

(72) Inventors: Chandan Garg, Punjab (IN); Alok Kumar Dwivedi, Gorakhpur (IN); Aishwarya Mallik, Bihar (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 114 days.

(21) Appl. No.: 16/175,956

(22) Filed: Oct. 31, 2018

(65) Prior Publication Data

US 2020/0137165 A1 Apr. 30, 2020

(51) Int. Cl.
*G09F 7/02* (2006.01)
*G09C 1/06* (2006.01)
*H04L 29/08* (2006.01)
*H04L 9/06* (2006.01)
*H04L 9/10* (2006.01)

(52) U.S. Cl.
CPC ............ *H04L 67/12* (2013.01); *H04L 9/0637* (2013.01)

(58) Field of Classification Search
None
See application file for complete search history.

(56) References Cited

U.S. PATENT DOCUMENTS

| | | | | |
|---|---|---|---|---|
| 5,579,008 | A * | 11/1996 | Hulderman | G01S 13/756 342/44 |
| 5,657,008 | A * | 8/1997 | Bantli | G08G 1/017 340/933 |
| 9,221,405 | B2 * | 12/2015 | Davis | B60R 13/10 |
| 9,663,043 | B2 * | 5/2017 | Belegu | B60R 13/10 |
| 10,733,160 | B1 * | 8/2020 | Leise | G06Q 40/00 |
| 2011/0078933 | A1 * | 4/2011 | Lukawitz | B60Q 1/56 40/204 |
| 2014/0090280 | A1 * | 4/2014 | Cunningham | B60R 25/1001 40/201 |
| 2016/0267451 | A1 * | 9/2016 | Eid | H04L 67/18 |
| 2018/0018723 | A1 * | 1/2018 | Nagla | G06Q 30/0609 |
| 2018/0191510 | A1 * | 7/2018 | Batten | H04W 12/0023 |
| 2018/0232693 | A1 * | 8/2018 | Gillen | G06F 16/288 |

OTHER PUBLICATIONS

Reimagining Interoperability: A Unified Tolling Network. Milligan Partners. (Year: 2016).*

(Continued)

*Primary Examiner* — Venkat Perungavoor
(74) *Attorney, Agent, or Firm* — Buchanan Ingersoll & Rooney PC

(57) ABSTRACT

A method for dynamic license plate renumbering includes: identifying, by a processing device of a processing server, a new plate number for a dynamic license plate; storing, by the processing server, the identified new plate number in a data entry with a vehicle identifier associated with the dynamic license plate; transmitting, by a transmitter of the processing server, the identified new plate number to the dynamic license plate; and displaying, on a display device of the dynamic license plate, the new plate number.

16 Claims, 5 Drawing Sheets

(56) References Cited

OTHER PUBLICATIONS

CN105404907. English Translation. (Year: 2016).*
A Traceable Blockchain-Based Access Authentication System with Privacy Preservation in VANETs. Zheng et al. IEEE. (Year: 2019).*
Blockchain: A Distributed Solution to Automotive Security and Privacy. Dorri. IEEE. (Year: 2017).*
CarChain: A Novel Public Blockchain-based Used Motor Vehicle History Reporting System. Masoud. JEEIT. (Year: 2019).*
Over 100,000 Digital License Plates Are Scheduled to Hit U.S. Roads in 2018. Major, Mario. (Year: 2017).*
Utilizing VIN for Improved Vehicular Sensing. Ali. IEEE. (Year: 2016).*
Multiple License Plate Detection for Complex Background. Hsieh. IEEE. (Year: 2005).*
License Number Plate Recognition using Template Matching and Bounding Box Method. Kusumadewi. J. Phys..: Conf. Ser. (Year: 2019).*
From restricting the use of cars by license plate numbers to congestion charging: Analysis for Medellin, Colombia. Ramos. Elsevier. (Year: 2017).*
CN 202010684176. English Translation. (Year: 2020).*

* cited by examiner

METHOD AND SYSTEM FOR DYNAMIC LICENSE PLATE NUMBERS

FIELD

The present disclosure relates to dynamic license plate numbers, specifically the use of a centralized system for renumbering license plates to assist with driver privacy and security without impeding the ability for law enforcement agencies and other governmental organizations to track vehicles and drivers.

BACKGROUND

In most countries, every vehicle is assigned a license plate thereto that is unique to that vehicle. In some countries, uniqueness may be with respect to the entire country; in others separate delineations may be used. For example, in the United States, every state regulates the license plates for vehicles in that state, enabling two vehicles in separate states to have the same license plate number, with the state of issuance being clear on the license plate. The uniqueness of a license plate can be beneficial for law enforcement and other governmental agencies when it comes to tracking the driver. For instance, if the vehicle is involved in a crime, that vehicle can be identified via the license plate even if there are other vehicles of the same make, model, and color in the area.

However, this uniqueness can also be a disadvantage to vehicle owners and operators. Stalkers, thieves, and other nefarious parties can use a license plate number to track a vehicle or its owner just as easily as law enforcement. If a vehicle owner wants to get a new license plate issued, such as to help confuse a stalker, the owner has to physically visit their local department of motor vehicles and go through a lengthy, time consuming process. For vehicle owners that are busy and cannot take time off of work to go through the process, this can be exceedingly difficult to arrange. Further, in a sharing economy, it may be advantageous to have a different license plate for each driver of a vehicle that is shared or otherwise available to members of the general public so that traffic incidents, parking and other violations can properly tracked, perhaps with each person having their own license plate number assigned to the individual rather than the vehicle. In addition, the distribution of new license plates to vehicle owners can often be just as time consuming, if not more so, detracting from the efficiency of motor vehicle departments.

Thus, there is a need a new technology that is more effective that a manual processes as described above or going on line to order new license plates. This technology would create a system for the dynamic renumbering of a license plate that can benefit the vehicle owner while at the same time retaining the ability for law enforcement and other agencies to be able to track the vehicle despite the renumbering.

SUMMARY

The present disclosure provides a description of systems and methods for dynamic license plate renumbering. License plate numbers are stored in a database that is accessible via the physical license plates themselves, or other device in communication with the license plate. The license plate (e.g., or other device) makes regular checks with the database such that when a new number is issued, the license plate will dynamically update its number as a result. The periodic checks ensure that the license plate will always update its number when possible, and also helps prevent any attempt at fraud by a nefarious vehicle owner. The database tracks the current and past numbers for each vehicle, enabling a law enforcement agency to easily identify a vehicle regardless of its plate number, where such information may be restricted for use by private parties. In some embodiments, a blockchain may be used as the database, providing immutability and thus greater security for the issuing of license plate numbers. In such embodiments, the license plate (e.g., or other device) may use a cryptographic key pair for interaction with the blockchain to even further increase the security involved in updating a dynamic license plate number.

A method for dynamic license plate renumbering includes: identifying, by a processing device of a processing server, a new plate number for a dynamic license plate; storing, by the processing server, the identified new plate number in a data entry with a vehicle identifier associated with the dynamic license plate; transmitting, by a transmitter of the processing server, the identified new plate number to the dynamic license plate; and displaying, on a display device of the dynamic license plate, the new plate number.

A system for dynamic license plate renumbering includes: a processing device of a processing server configured to identify a new plate number for a dynamic license plate; the processing server configured to store the identified new plate number in a data entry with a vehicle identifier associated with the dynamic license plate; a transmitter of the processing server configured to transmit the identified new plate number to the dynamic license plate; and a display device of the dynamic license plate configured to display the new plate number.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Dynamic License Plate Renumbering

Figure 1:
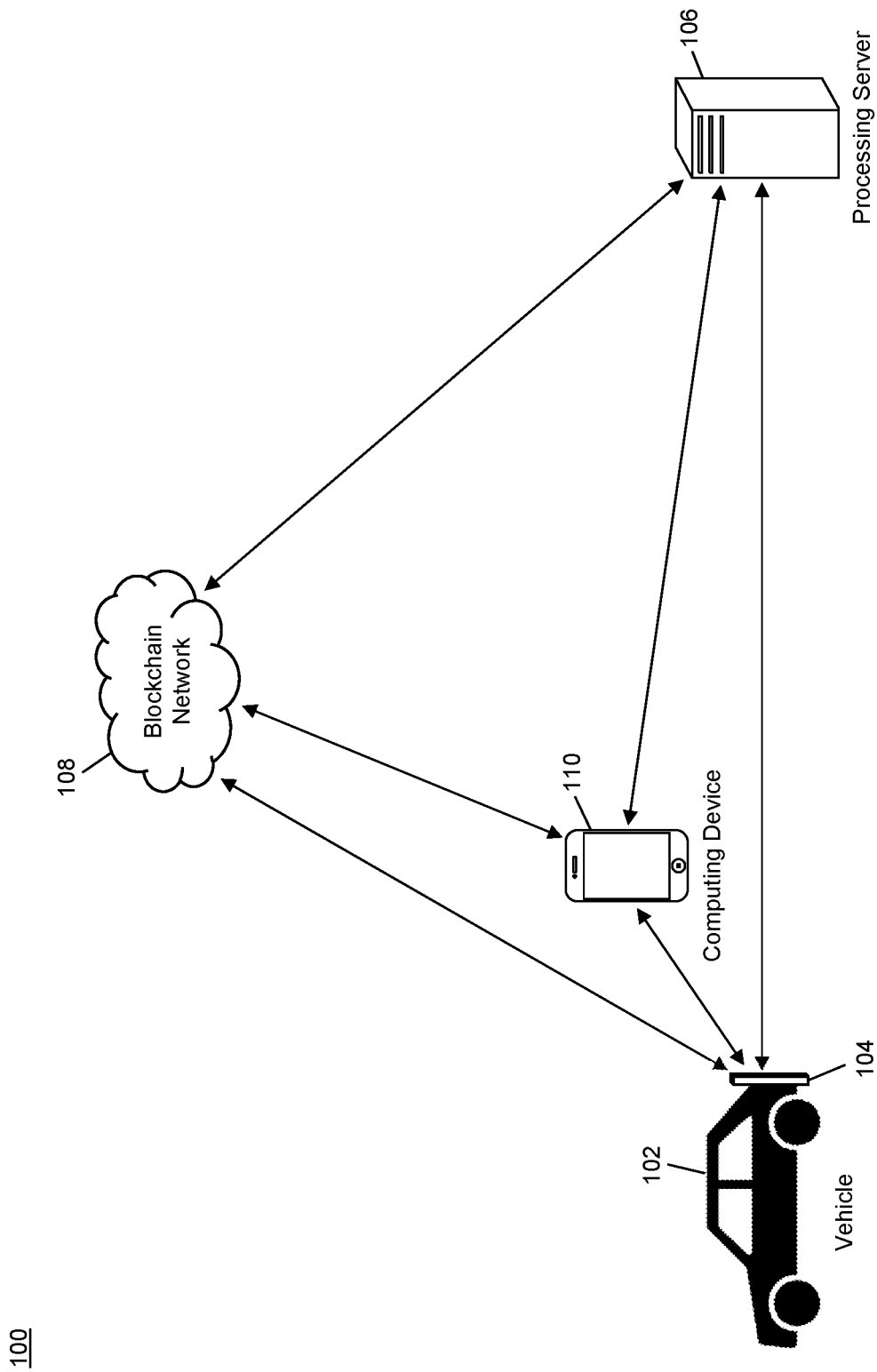
FIG. 1 is a block diagram illustrating a high level system architecture for dynamic license plate renumbering in accordance with exemplary embodiments.

FIG. 1 illustrates a system 100 for the dynamic renumbering of license plates for a vehicle with a database used to maintain a historic ledger of license plates issued to a specific vehicle for the tracking thereof.

The system 100 may include a vehicle 102. The vehicle 102 may be an automobile, truck, trailer, motorcycle, boat, or any other type of vehicle that may be assigned a license plate number that is directly associated with the vehicle 102. The vehicle 102 may include a dynamic license plate 104. The dynamic license plate 104 may be configured to display the license plate number assigned to the vehicle 102 on which it resides. This could be done using electric ink displays, light emitting diode display, LCD displays or other electronic display technology, mechanical systems, light emitting diode display, thin film transistor display, capacitive touch display, cathode ray tube display, light projection display, or other displays that selectively display alphanumeric characters. As discussed herein, the dynamic license plate number 104 may be configured to receive updated license plate numbers and dynamically change the license plate number being displayed thereon to the updated license plate number.

In some embodiments the system 100 may also include a processing server 106. The processing server 106 may be configured to track license plate numbers that are transmitted to a dynamic license plate 104 to maintain a record of all license plate numbers issued to a specific vehicle 102. In some embodiments, such a record may not be publicly accessible. In such embodiments, the record may be made accessible to law enforcement agencies or other agencies to which such information may be entrusted, such as a jurisdiction's department of motor vehicles. In some cases, the processing server 106 may be a part of a jurisdiction's department of motor vehicles.

In the system 100, the processing server 106 may maintain the record of license plate numbers for all vehicles 102 for which the processing server 106 is configured to manage. For instance, a processing server 106 may be associated with a specific jurisdiction, and may thereby maintain a record of all vehicles 102 and license plate numbers issued thereto in that jurisdiction. A new license plate number may be issued to a specific vehicle 102. Vehicles 102 may be kept track of using a vehicle identifier that is unique to that vehicle. The vehicle identifier may be a single value (e.g., vehicle identification number) or a combination of values (e.g., make, model, color, trim, etc.) that is unique to a specific vehicle 102.

In some cases, license plate numbers may be issued periodically, such as using a set schedule (e.g., where all license plate numbers may be updated at the same time, or on a rolling basis). In other cases, a new license plate number may be issued upon request, such as by the owner of a vehicle, or by a person as his or her personal license plate number. In such a case, the vehicle owner may submit a request to the processing server 106 via a computing device 110, such as using a web interface, application program, short messaging service message, or other suitable communication method. The computing device 110 may be any suitable type of computing device, such as a desktop computer, laptop computer, tablet computer, notebook computer, cellular phone, smart phone, smart watch, smart television, wearable computing device, implantable computing device, etc.

In some embodiments, when a new license plate number is issued for a vehicle 102, the processing server 106 may "push" the license plate number to the dynamic license plate 104 for that vehicle 102. In one such embodiment, the processing server 106 may electronically transmit the updated license plate number directly to the dynamic license plate 104 using a suitable communication network and method. For instance, the dynamic license plate 104 may use cellular communication to receive transmissions from the processing server 106 from any location via a cellular network. In another example, the dynamic license plate 104 may use a short-range communication method to where the vehicle 102 (e.g., or dynamic license plate 104) may be brought to a distance suitable for communication with the processing server 106. For instance, stations may be set up around a given location that are connected to processing servers 106 where a vehicle 102 may drive up to the station to receive a new license plate number therefrom.

In another embodiment, the new license plate number may be electronically transmitted to the computing device 110 by the processing server 106. In such an embodiment, the computing device 110 may receive the license plate number from the processing server 106 using any suitable communication method, and may then transmit the license plate number to the dynamic license plate 104 using another suitable communication method. For instance, the computing device 110 may receive the license plate number from the processing server 106 using cellular communication, and then may transmit the license plate number to the dynamic license plate 104 using near field communication, Bluetooth, radio frequency, etc.

In some embodiments, the dynamic license plate 104 (e.g., or computing device 110, as applicable) may be configured to periodically check (e.g., "pull") for updated license plate numbers. In such embodiments, at a predetermined interval the dynamic license plate 104 may send an electronic transmission to the processing server 106 requesting the current license plate number issued to the dynamic license plate 104. When the current license plate number issued to the dynamic license plate 104 is different from the license plate number being display, the dynamic license plate 104 may change the license plate number displayed thereon. The dynamic license plate 104 may use any type of display that is suitable for the display of a license plate number, such as liquid crystal display, light emitting diode display, electronic ink display, other electronic display technology, mechanical systems, etc.

In some embodiments, a blockchain may be used to store records of license plate numbers issued to vehicles 102. In such embodiments, the system 100 may include a blockchain network 108. The blockchain network 108 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the processing server 106 may be a node in the blockchain network 108. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 108 prior to the generation and addition of a new block to the blockchain in order for the change to be made permanent. Computational and communication limitations may make such a modification exceedingly difficult, if not impossible, thus rendering the blockchain immutable.

Each blockchain data value may correspond to a license plate number record. The blockchain data value may thus include at least a license plate number and the vehicle identifier for the vehicle 102 to which the license plate number was issued. In some cases, the blockchain data value may include a term of validity for the license plate number. In other cases, such a term may be identified through timestamps of the blocks in the blockchain (e.g., a license plate number may be active starting from the timestamp when it was added to the blockchain and the timestamp of the next block that includes a blockchain data value having that vehicle identifier).

In embodiments where a blockchain is used, the processing server 106 may submit new license plate numbers and vehicle identifiers to a node in the blockchain network 108 for the generation of new blockchain data values that are included in new blocks that are validated and added to the blockchain. The dynamic license plate 104 and/or computing device 110, as applicable, may periodically check the blockchain via a node in the blockchain network 108 for a new blockchain data value that includes the vehicle identifier for the vehicle 102. If a new blockchain data value is detected, the dynamic license plate 104 (e.g., or computing device 110, as applicable) may identify the license plate number included therein, and display the new license plate number.

In some embodiments, the dynamic license plate 104 (e.g., or computing device 110, as applicable) may be configured to request a new license plate number from a node in the blockchain network 108. In such embodiments, the dynamic license plate 104 may submit a request that includes the vehicle identifier for the vehicle 102 associated therewith. The node may receive the request and may identify a new license plate number for the vehicle 102 (e.g., directly by the node or requested from a separate system, such as the processing server 106). A new blockchain data value may be created and included in a new block that is validated and added to the blockchain. The new license plate number or blockchain data value may be transmitted back to the dynamic license plate 104.

In some such embodiments, the dynamic license plate 104 may be required to authenticate itself with the node when requesting a new license plate number, such that an unauthorized party may be unable to have a new license plate number issued to a vehicle 102. In such embodiments, the dynamic license plate 104 (e.g., or computing device 110, as applicable) may have a cryptographic key pair associated therewith, which may be generated directly by the dynamic license plate 104 or assigned thereto. The cryptographic key pair may be comprised of a private key and a public key. The private key may be retained by the dynamic license plate 104 in memory thereof, and the public key distributed to the nodes in the blockchain network 108. The nodes may store the public key along with the vehicle identifier associated with the vehicle 102 for which the dynamic license plate 104 displays the license plate number. When requesting a new license plate number, the dynamic license plate 104 (e.g., or computing device 110, as applicable) may generate a digital signature using the private key. The digital signature may be included in the request that is submitted to the node in the blockchain network 108. The node may validate the digital signature using the corresponding public key, where successful validation must occur before a new license plate number is assigned and transmitted back to the dynamic license plate 104.

The methods and systems herein enable a dynamic license plate 104 to dynamically update the license plate number that is displayed for a vehicle 102. A database, distributed among a blockchain network 108 or processing servers 106, may maintain a record of all license plate numbers assigned to a vehicle 102, enabling law enforcement, motor vehicle departments, and other authorized agencies to know the current and past license plate numbers assigned to a vehicle 102 such that current methods for tracking and identifying vehicles 102 may still be used. At the same time, the dynamic updating of license plate numbers for a vehicle 102 may provide the driver thereof with additional privacy and security against thieves, stalkers, and other nefarious parties. Furthermore, the dynamic updating of license plate numbers may also reduce the types and overall number of activities performed at motor vehicle departments, which may increase the efficiency thereof and save time for vehicle owners.

Computing System

Figure 2:
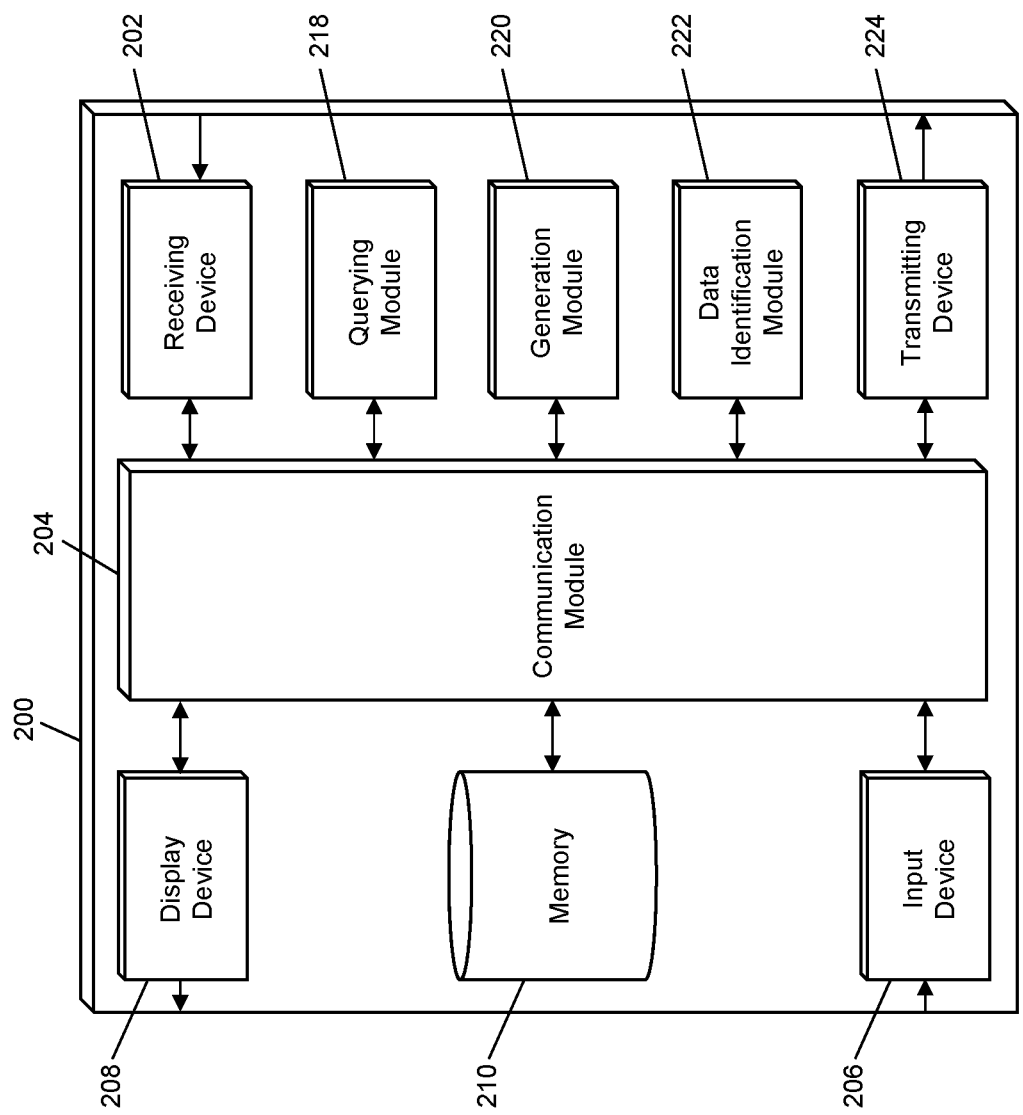
FIG. 2 is a block diagram illustrating a computing system that may be a part of the system of FIG. 1 for the dynamic renumbering of license plates in accordance with exemplary embodiments.

FIG. 2 illustrates an embodiment of a computing system 200 in the system 100. It will be apparent to persons having skill in the relevant art that the embodiment of the computing system 200 illustrated in FIG. 2 is provided as illustration only and may not be exhaustive to all possible configurations of the computing system 200 suitable for performing the functions as discussed herein. For example, the computer system 500 illustrated in FIG. 5 and discussed in more detail below may be a suitable configuration of the computing system 200. The computing system 200 may be configured to perform the functions of the dynamic license plate 104 and/or processing server 106. In instances where the processing server 106 may be a node in the blockchain network 108, nodes in the blockchain network 108 may be configured to perform the functions of the computing system 200 as discussed herein.

The computing system 200 may include a receiving device 202. The receiving device 202 may be configured to receive data over one or more networks via one or more network protocols. In some instances, the receiving device 202 may be configured to receive data from dynamic license plates 104, processing servers 106, computing systems 110, blockchain networks 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by dynamic license plates 104 or computing devices 110 that may be superimposed or otherwise encoded with requests for license plate numbers, which may include a vehicle identifier and, in some cases, may include authentication information, such as a digital signature. The receiving device 202 may also be configured to receive data signals electronically transmitted by processing servers 106, nodes in blockchain networks 108, or computing devices 110, which may be superimposed or otherwise encoded with new license plate numbers and associated vehicle identifiers.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, data identification module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing system 200 may also include or be otherwise interfaced with one or more input devices 206. The input devices 206 may be internal to the computing system 200 or external to the computing system 200 and connected thereto via one or more connections (e.g., wired or wireless) for the transmission of data to and/or from. The input devices 206 may be configured to receive input from a user of the computing system 200, which may be provided to another module or engine of the computing system 200 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive user instructions for requesting a new license plate number, new license plate numbers for distribution, settings for push or pull intervals for license plate numbers, etc.

The computing system 200 may also include or be otherwise interfaced with a display device 208. The display device 208 may be internal to the computing system 200 or external to the computing system 200 and connected thereto via one or more connections (e.g., wired or wireless) for the transmission of data to and/or from. The display device 208 may be configured to display data to a user of the computing system 200. The display device 208 may be any type of display suitable for displaying data as part of the functions discussed herein, such as electronic ink display, a liquid crystal display, light emitting diode display, thin film transistor display, capacitive touch display, cathode ray tube display, light projection display, etc. In some instances, the computing system 200 may include multiple display devices 208. The display device 208 may be configured to, for example, display a license plate number and update the license plate number based on receipt of new license plate numbers by the receiving device 202 of the computing system 200.

The computing system 200 may also include a memory 210. The memory 210 may be configured to store data for use by the computing system 200 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein. The memory 210 may be configured to store, for example, blockchain data, hashing algorithms for generating blocks, communication data for blockchain nodes, communication data for computing devices 110, vehicle identifiers, cryptographic key pairs, private keys, public keys, digital signature algorithms, license plate number records, etc.

The computing system 200 may include a querying module 218. The querying module 218 may be configured to execute queries on databases to identify information. The querying module 218 may receive one or more data values or query strings, and may execute a query string based thereon on an indicated database, such as the memory 210, to identify information stored therein. The querying module 218 may then output the identified information to an appropriate engine or module of the computing system 200 as necessary. The querying module 218 may, for example, execute a query on the memory 210 to insert a new license plate number therein for the updating of a displayed license plate number.

The computing system 200 may also include a generation module 220. The generation module 220 may be configured to generate data for use by the computing system 200 in performing the functions discussed herein. The generation module 220 may receive instructions as input, may generate data based on the instructions, and may output the generated data to one or more modules of the computing system 200. For example, the generation module 220 may be configured to generate notifications and other data messages for transmission to dynamic license plates 104, processing servers 106, blockchain networks 108, computing devices 110, etc. The generation module 220 may also be configured to generate license plate numbers, cryptographic key pairs, digital signatures, blockchain data values, and new blockchain blocks, as applicable.

The computing system 200 may also include a data identification module 222. The data identification module 222 may be configured to identify data for the computing system 200 for use in the functions discussed herein. The data identification module 222 may receive an instruction regarding data to be identified as input, may identify the data, and may then output the identified data to another module or engine of the computing system 200. For example, the data identification module 222 may be config-ured to identify new license plate numbers for transmission to a dynamic license plate 104 for display thereon.

The computing system 200 may also include a transmitting device 224. The transmitting device 224 may be configured to transmit data over one or more networks via one or more network protocols. In some instances, the transmitting device 224 may be configured to transmit data to dynamic license plates 104, processing servers 106, blockchain networks 108, computing devices 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to computing devices 110, processing servers 106, and nodes in blockchain networks 108 that may be superimposed or otherwise encoded with a request for a new license plate number, which may include at least a vehicle identifier and may, in some instances, also include a digital signature. The transmitting device 224 may also be configured to electronically transmit data signals to dynamic license plates 104, nodes in blockchain networks 108, and computing devices 110, which may be superimposed or otherwise encoded with a new license plate number, which may also be accompanied by a vehicle identifier associated therewith.

Process for Renumbering of a Dynamic License Plate

Figure 3:
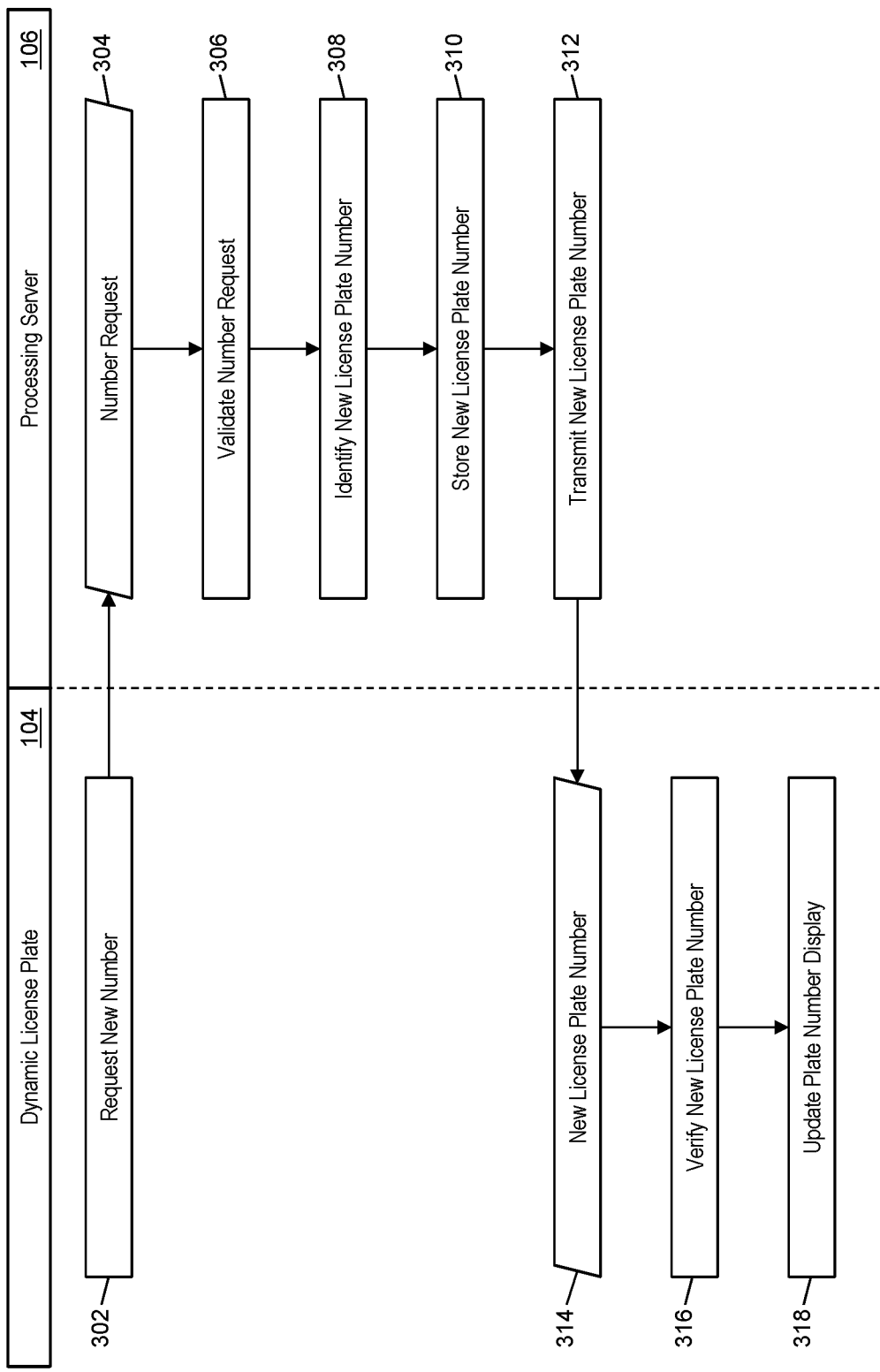
FIG. 3 is a flow diagram illustrating a process for the dynamic renumbering of a license plate in the system of FIG. 1 in accordance with exemplary embodiments.

FIG. 3 illustrates an example process for the renumbering of a dynamic license plate 104 in the system 100 illustrated in FIG. 1 using the processing server 106. In some embodiments, the processing server 106 may be a node in the blockchain network 108, where license plate number data may be stored as blockchain data values in a blockchain associated therewith.

In step 302, a transmitting device 224 of a dynamic license plate 104 may electronically transmit a request for a new license plate number to the processing server 106 using a suitable communication network and method. The request may include at least a vehicle identifier associated with the vehicle 102 for which the new license plate number is requested, and may, in some cases, include a digital signature, such as may be generated via a generation module 220 of the dynamic license plate 104 using a private key associated therewith (e.g., and stored in a memory 210 of the dynamic license plate 104). In step 304, a receiving device 202 of the processing server 106 may receive the request for a new license plate number.

In step 306, the processing server 106 may validate the request for a new license plate number. In embodiments where the request includes a digital signature, validation of the request may include validation of the digital signature using a public key associated with the dynamic license plate 104 and/or vehicle 102, such as may be identified in a memory 210 of the processing server 106 using the vehicle identifier. In some cases, validation of the request may also include determining if the vehicle 102 is eligible for a new number. For instance, there may be limits placed on how often a vehicle 102 may be assigned a new license plate number. In step 308, a data identification module 222 and/or generation module 220 of the processing server 106 may identify a new license plate number for the vehicle 102.

In step 310, a querying module 218 of the processing server 106 may execute a query on the memory 210 of the processing server 106 to store a new record therein for the vehicle 102 with the newly identified license plate number. In embodiments where a blockchain is used, step 310 may include transmission (e.g., via a transmitting device 224 of the processing server 106) of the newly identified license plate number to a node in the blockchain network 108 along with the vehicle identifier for storage in the blockchain in a new blockchain data value. In step 312, the transmitting device 224 of the processing server 106 may electronically transmit the new license plate number to the dynamic license plate 104 using a suitable communication network and method. In some cases, the transmission may further include the vehicle identifier. In some instances, the processing server 106 may also include authentication data, such as a digital signature generated using a private key associated with the processing server 106.

In step 314, a receiving device 202 of the dynamic license plate 104 may receive the new license plate number and any accompanying information. In step 316, the dynamic license plate 104 may verify the new license plate number. Verification may include checking that the vehicle identifier accompanying the license plate number is correct for the vehicle 102, and, in cases where a digital signature is provided, validation of the digital signature using a public key associated with the processing server 106. In step 318, a display device 208 of the dynamic license plate 104 may update the license plate number displayed thereon to the newly received license plate number.

Exemplary Method for Dynamic License Plate Renumbering

Figure 4:
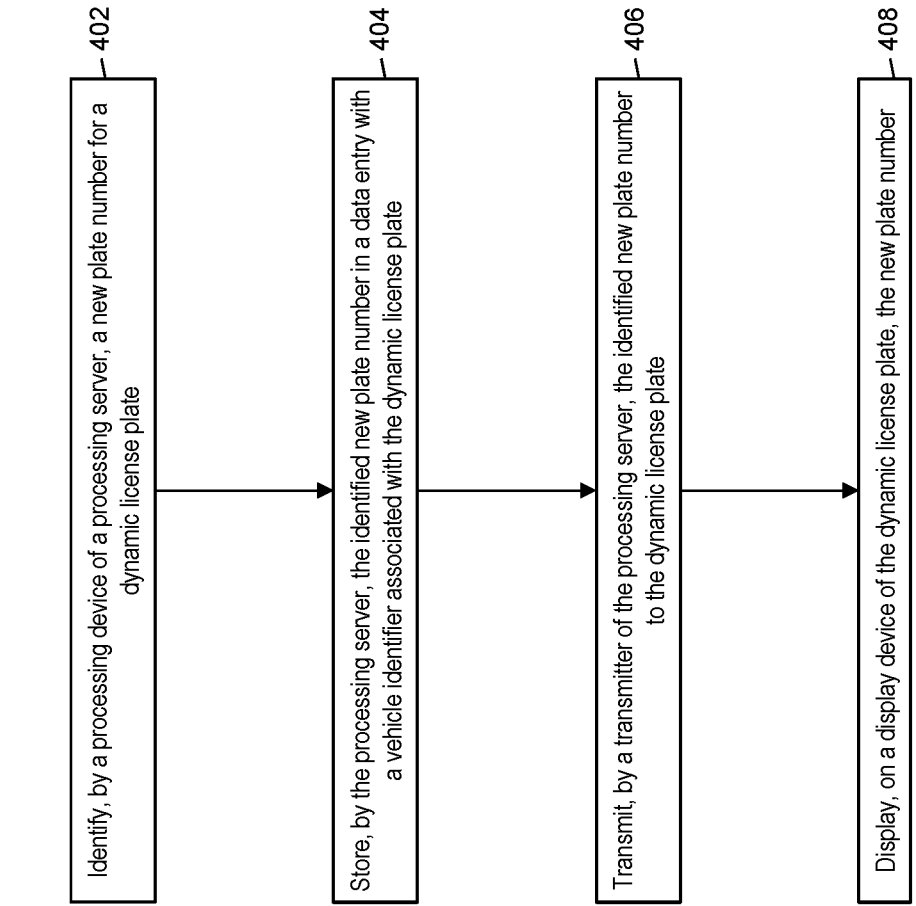
FIG. 4 is a flow chart illustrating an exemplary method for dynamic license plate renumbering in accordance with exemplary embodiments.

FIG. 4 illustrates a method 400 for the dynamic renumbering of a license plate number displayed on a license plate.

In step 402, a new plate number may be identified by a processing device (e.g., a querying module 218, data identification module 222, etc.) of a processing server (e.g., the processing server 106, computing system 200, etc.) for a dynamic license plate (e.g., the dynamic license plate 104). In step 404, the new identified play number may be stored (e.g., in a memory 210) by the processing server in a data entry with a vehicle identifier associated with the dynamic license plate.

In step 406, the identified new plate number may be transmitted by a transmitter (e.g., the transmitting device 224) of the processing server to the dynamic license plate. In step 408, the new plate number may be displayed on a display device (e.g., the display device 208) of the dynamic license plate.

In one embodiment, the method 400 may further include receiving, by the receiver of the processing server, a number request associated with the dynamic license plate where the number request includes at least the vehicle identifier, wherein the new plate number is identified following receipt of the number request. In a further embodiment, the number request may be received from the dynamic license plate. In another further embodiment, the number request may be received from a computing device (e.g., the computing device 110) separate from the dynamic license plate. In some embodiments, the new plate number may be identified after a predetermined period of time has elapsed since identification of a prior plate number associated with the dynamic license plate.

In one embodiment, the data entry may be included in a new block that is added to a blockchain, and the blockchain may be comprised of a plurality of blocks, where each block includes at least a block header and one or more data values, each data value including a dynamic plate number and a corresponding vehicle identifier. In a further embodiment, the data entry may further include a digital signature associated with the dynamic license plate. In an even further embodiment, the digital signature may be generated using a private key of a cryptographic key pair associated with the dynamic license plate, and the private key may be stored in a memory of the license plate.

Computer System Architecture

Figure 5:
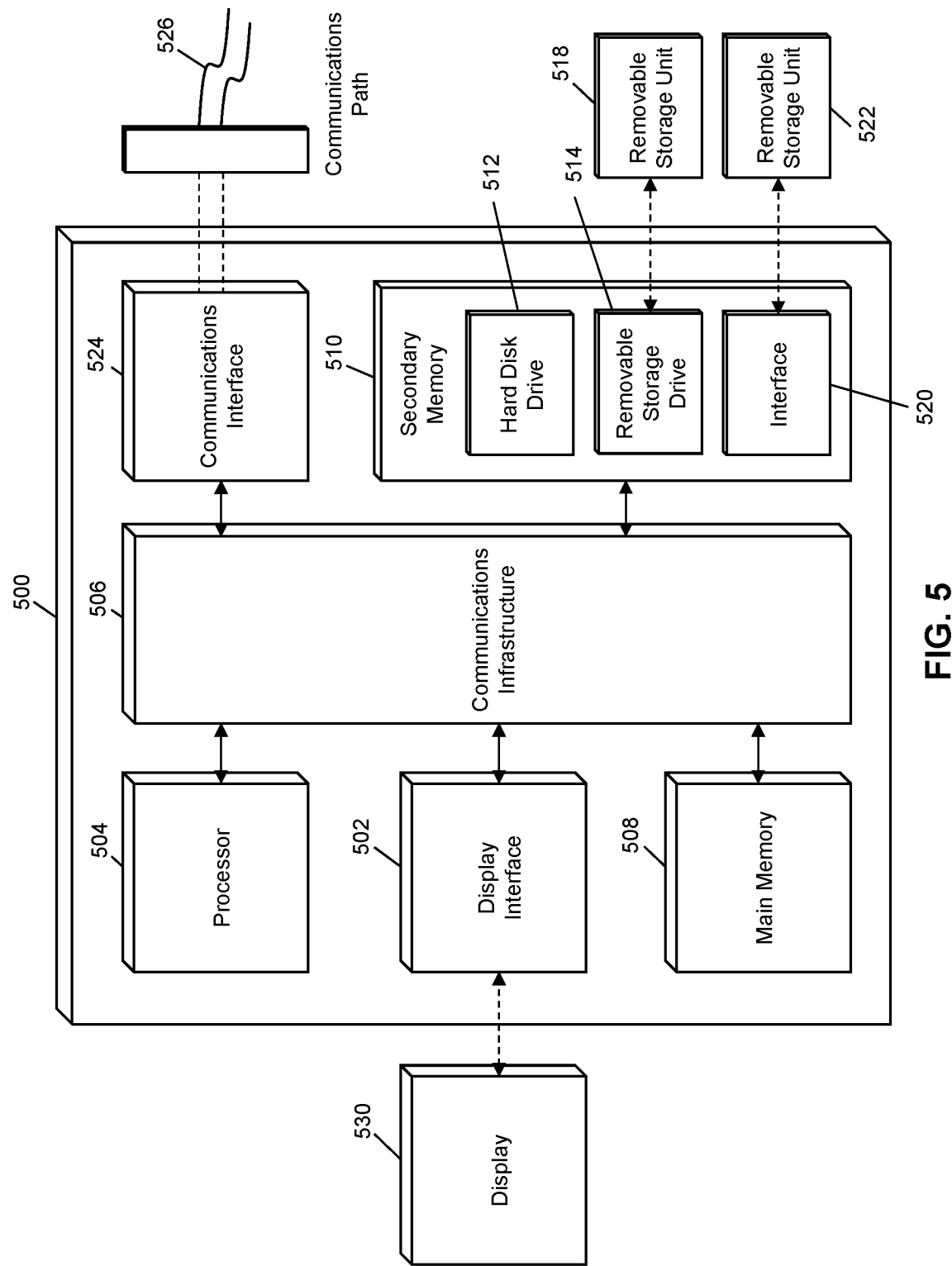
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the dynamic license plate 104 and processing server 106 of FIG. 1 and/or the computing system 200 of FIG. 2 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for dynamic license plate renumbering. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for dynamic license plate renumbering, comprising:
   identifying, by a processing device of a processing server, a new plate number for a dynamic license plate having an assigned current plate number;
   storing, by the processing server, the identified new plate number in a data entry with a vehicle identifier associated with the dynamic license plate;
   transmitting, by a transmitter of the processing server, the identified new plate number to the dynamic license plate to replace the current plate number for display; and
   displaying, on a display device of the dynamic license plate, the new plate number.

2. The method of claim 1, further comprising:
   receiving, by the receiver of the processing server, a number request associated with the dynamic license plate where the number request includes at least the vehicle identifier, wherein
   the new plate number is identified following receipt of the number request.

3. The method of claim 2, wherein the number request is received from the dynamic license plate.

4. The method of claim 2, wherein the number request is received from a computing device separate from the dynamic license plate.

5. The method of claim 1, wherein the new plate number is identified after a predetermined period of time has elapsed since identification of a prior plate number associated with the dynamic license plate.

6. The method of claim 1, wherein
   the data entry is included in a new block that is added to a blockchain, and
   the blockchain is comprised of a plurality of blocks, where each block includes at least a block header and one or more data values, each data value including a dynamic plate number and a corresponding vehicle identifier.

7. The method of claim 6, wherein the data entry further includes a digital signature associated with the dynamic license plate.

8. The method of claim 7, wherein
   the digital signature is generated using a private key of a cryptographic key pair associated with the dynamic license plate, and
   the private key is stored in a memory of the license plate.

9. A system for dynamic license plate renumbering, comprising:
   a processing device of a processing server configured to identify a new plate number for a dynamic license plate having an assigned current plate number;
   the processing server configured to store the identified new plate number in a data entry with a vehicle identifier associated with the dynamic license plate;
   a transmitter of the processing server configured to transmit the identified new plate number to the dynamic license plate to replace the current plate number for display; and
   a display device of the dynamic license plate configured to display the new plate number.

10. The system of claim 9, wherein
    the receiver of the processing server is further configured to receive a number request associated with the dynamic license plate where the number request includes at least the vehicle identifier, and
    the new plate number is identified following receipt of the number request.

11. The system of claim 10, wherein the number request is received from the dynamic license plate.

12. The system of claim 10, wherein the number request is received from a computing device separate from the dynamic license plate.

13. The system of claim 9, wherein the new plate number is identified after a predetermined period of time has elapsed since identification of a prior plate number associated with the dynamic license plate.

14. The system of claim 9, wherein
    the data entry is included in a new block that is added to a blockchain, and
    the blockchain is comprised of a plurality of blocks, where each block includes at least a block header and one or more data values, each data value including a dynamic plate number and a corresponding vehicle identifier.

15. The system of claim 14, wherein the data entry further includes a digital signature associated with the dynamic license plate.

16. The system of claim 15, wherein
    the digital signature is generated using a private key of a cryptographic key pair associated with the dynamic license plate, and
    the private key is stored in a memory of the license plate.

* * * * *